United States Patent
Kim et al.

(10) Patent No.: US 10,382,928 B2
(45) Date of Patent: Aug. 13, 2019

(54) INTERNET OF THINGS DEVICE AND COMMUNICATION METHOD THEREOF

(71) Applicant: SAMSUNG ELECTRONICS CO., LTD., Suwon-si (KR)

(72) Inventors: Sungjin Kim, Suwon-si (KR); Wooram Hong, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 298 days.

(21) Appl. No.: 15/001,228

(22) Filed: Jan. 19, 2016

(65) Prior Publication Data

US 2016/0270054 A1 Sep. 15, 2016

(30) Foreign Application Priority Data

Mar. 10, 2015 (KR) .......... 10-2015-0033311

(51) Int. Cl.
*H04W 4/80* (2018.01)
*H04W 76/10* (2018.01)
*H04W 74/08* (2009.01)
*H04W 8/00* (2009.01)

(52) U.S. Cl.
CPC ......... *H04W 4/80* (2018.02); *H04W 74/0808* (2013.01); *H04W 76/10* (2018.02); *H04W 8/005* (2013.01)

(58) Field of Classification Search
CPC ................. H04W 72/048; H04W 72/005
See application file for complete search history.

(56) References Cited

U.S. PATENT DOCUMENTS

| | | | |
|---|---|---|---|
| 5,297,142 A | 3/1994 | Paggeot et al. | |
| 5,301,279 A | 4/1994 | Riley et al. | |
| 7,515,899 B1 | 4/2009 | Carr et al. | |
| 8,036,430 B2 | 10/2011 | Tokuse | |
| 8,208,690 B2 | 6/2012 | Tokuse | |
| 2011/0041136 A1 | 2/2011 | Messier et al. | |
| 2012/0246322 A1 | 9/2012 | Patil et al. | |
| 2012/0324245 A1 | 12/2012 | Sinha et al. | |
| 2014/0038654 A1 | 2/2014 | Sassan Ahmadi | |
| 2014/0324973 A1* | 10/2014 | Goel | H04L 12/2803 709/204 |
| 2016/0028605 A1* | 1/2016 | Gil | H04W 4/006 709/213 |
| 2016/0063997 A1* | 3/2016 | Nemala | G10L 15/20 704/233 |

FOREIGN PATENT DOCUMENTS

| | | |
|---|---|---|
| JP | 11025035 | 1/1999 |
| JP | 4254873 | 2/2009 |
| JP | 2010068075 | 3/2010 |
| KR | 1020140047314 | 4/2014 |

* cited by examiner

*Primary Examiner* — Rhonda L Murphy
(74) *Attorney, Agent, or Firm* — Cantor Colburn LLP

(57) ABSTRACT

A computing device of an Internet of Things ("IoT") system receives an indication signal indicating whether a physical resource of an IoT device is in use from the IoT device, and determines whether the physical resource is being used based on the indication signal. When the physical resource is not being used, the computing device uses the physical resource of the IoT device.

21 Claims, 13 Drawing Sheets

INTERNET OF THINGS DEVICE AND COMMUNICATION METHOD THEREOF

CROSS-REFERENCE TO RELATED APPLICATION

This application claims priority to Korean Patent Application No. 10-2015-0033311 filed on Mar. 10, 2015, and all the benefits accruing therefrom under 35 U.S.C. § 119, the content of which in its entirety is incorporated herein by reference.

BACKGROUND

1. Field

The embodiments relate generally to an internet of things device and an internet of things device communication method.

2. Description of the Related Art

In the Internet of Things ("IoT"), a computing device may share and use various IoT devices. In this case, the computing device may be connected to the IoT device through a base station, or may be directly connected to the IoT device by communication methods such as Bluetooth™.

The current Bluetooth™ provides connection methods such as a pairing-based method or a connection-based method between devices.

SUMMARY

In a pairing-based method, the Internet of Things ("IoT") device sets a primary device through pairing with a computing device. When the IoT device sets the computing device as the primary device through the pairing, other computing devices cannot access the IoT device before the IoT device releases the pairing with the computing device set as the primary device. In the connection based method, before the IoT device is disconnected from the computing device while the IoT device is connected with the computing device, other computing devices cannot be connected to the IoT device. Therefore, when the computing device is connected to the IoT device, other computing devices cannot use a physical resource of the IoT device even though the connected computing device is not using the physical resource of the IoT device.

Embodiments provide a computing device for verifying whether to use a physical resource of an IoT device.

An embodiment of an IoT device in an IoT system includes a network interface for communicating with a computing device, a processor, and a memory storing instructions to be executed by the processor. The processor may transmit, to the computing device, an indication signal indicating whether a physical resource of the IoT device is being used, and may receive, from the computing device, data to be performed on the physical resource when the physical resource is not in use.

In an embodiment, the processor may receive a request signal for querying whether the physical resource is in use from the computing device and transmit the indication signal in response to the request signal.

In an embodiment, the processor is connected with the computing device and receives the request signal.

In an embodiment, the request signal may be broadcasted from the computing device.

In an embodiment, the processor may broadcast the indication signal.

In an embodiment, the indication signal may include a sound with a predetermined band.

In an embodiment, the predetermined band may be an inaudible band.

In an embodiment, the processor may transmit the indication signal through a different connection from a connection between the IoT device and another computing device.

In an embodiment, the different connection may include a different connection in a channel which is the same as a channel defined between the IoT device and another computing device, a different channel in a link which is the same as a link defined between the IoT device and another computing device, or a different link from the link defined between the IoT device and another computing device.

In an embodiment, the indication signal may include information indicating the IoT device or the physical resource.

In an embodiment, the information may include a predetermined pattern.

In an embodiment, the network interface may provide a Bluetooth connection.

In an embodiment, the physical resource may include an output resource of the IoT device or an input resource of the IoT device.

In an embodiment, the physical resource may include a computing resource of the IoT device.

In an embodiment, the physical resource may not be a radio communication resource of the IoT device.

Another embodiment provides an IoT device in which a processor registers priorities of a plurality of computing devices, and when a use request of the physical resource of the IoT device is received from a first computing device of the plurality of computing devices registered as a primary access device, the processor approves use request of the physical resource from the first computing device regardless of whether the physical resource is in use.

In an embodiment, when a use request of the physical resource of the IoT device is received from a second computing device of the plurality of computing devices registered as a secondary access device in the IoT device, the processor may reject the use request of the physical resource from the second computing device when the physical resource is in use.

In an embodiment, the when the physical resource is not in use, the processor may approve the use request of the physical resource from the second computing device.

Yet another embodiment provides a method including determining whether a physical resource of an IoT device is in use, notifying whether the physical resource of the IoT device is in use to a computing device, and receiving data to be performed on the physical resource from the computing device when the physical resource is not in use.

In an embodiment, the method may further include receiving a request signal for querying whether the physical resource is in use from the computing device. The notifying whether the physical resource is in use may include transmitting an indication signal for indicating whether the physical resource is in use as a response to the request signal.

In an embodiment, the indication signal may indicate that the physical resource is not in use, and the notifying whether the physical resource is in use may further include notifying that the physical resource is in use by not transmitting the response to the request signal to the computing device for a predetermined time when the physical resource is in use.

In an embodiment, notifying whether the physical resource is in use may include notifying a rejection of a connection between the IoT device and the computing device to the computing device when the physical resource is in use.

In an embodiment, notifying whether the physical resource is in use may include notifying an approval of a connection between the IoT device and the computing device to the computing device when the physical resource is not in use.

In an embodiment, the method may further include receiving a request signal for querying whether the physical resource is in use, which is broadcasted in the computing device.

In an embodiment, the notifying whether the physical resource is in use may include periodically transmitting the indication signal for indicating whether the physical resource is in use.

In an embodiment, the notifying whether the physical resource is in use may include transmitting the indication signal when the physical resource is not in use.

Still another embodiment provides a method including receiving a request for using a physical resource of an IoT device from a computing device, determining whether the computing device is a primary access device; and approving that the computing device uses the physical resource regardless of whether the physical resource is in use when the computing device is the primary access device.

In an embodiment, the method may further include releasing, when the physical resource is being used by another computing device, occupation of the physical resource by another computing device.

BRIEF DESCRIPTION OF THE DRAWINGS

The above and other embodiments, advantages and features of this disclosure will become more apparent by describing in further detail embodiments thereof with reference to the accompanying drawings, in which.

DETAILED DESCRIPTION

Figure 1:
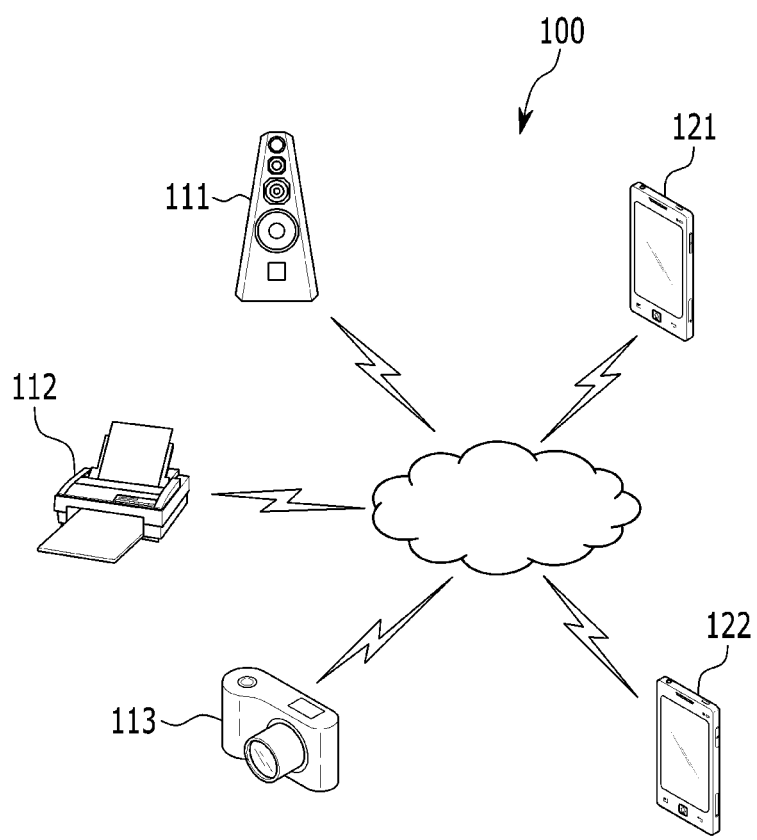
FIG. 1 exemplifies an IoT system according to an embodiment.

Embodiments will be described below in detail with reference to accompanying drawings. As those skilled in the art would realize, the described embodiments may be modified in various different ways. In addition, the drawings and description are to be regarded as illustrative in nature and not restrictive. Like reference numerals designate like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 exemplifies an internet of things ("IoT") system according to an embodiment. FIG. 1 is an example of a possible system, and an embodiment may be implemented by various different systems.

Referring to FIG. 1, an IoT system 100 according to an embodiment includes IoT devices 111, 112, and 113. Each IoT device may be a device which provides other devices with its computing resources. In one embodiment, the IoT device may include any one of peripheral devices of various types of computing devices. The various types of peripheral devices may include a speaker 111, a printer 112, a camera 113, and the like, for example, but are not limited thereto. In another embodiment, the IoT device may include any one of various other types of appliances. In an embodiment, the various other types of appliances may include, by way of non-limiting example, a television, a refrigerator, an air conditioner, a dishwasher, a washing machine, and the like. In another embodiment, the IoT device may include various types of computing devices.

The IoT system 100 further includes computing devices 121 and 122 which are connected to the IoT devices 111, 112, and 113 and use physical resources of the IoT devices 111, 112, and 113. In one embodiment, the computing device may be any one of various types of terminals. In an embodiment, the various types of terminals may include, by way of non-limiting example, a mobile device such as a smart phone, a tablet computer, a laptop computer, a desktop computer, a smart watch, a personal digital assistant ("PDA"), and the like.

In an embodiment, the computing devices 121 and 122 may be connected to the IoT devices 111, 112, and 113 through a wireless access technique, for example. In an embodiment, the wireless access technique may be a wireless personal area network ("PAN") which is standardized through IEEE 802.15.1 and the like, for example. In one embodiment, the wireless access technique may be Bluetooth™ of the wireless PAN, for example. In another embodiment, the wireless access technique may be a wireless LAN which is standardized through IEEE 802.11 and the like, or a WiFi Direct which is standardized through WiFi Alliance, for example. In an alternative embodiment, the wireless access technique may be a technique which provides connection through an air interface. However, the wireless access technique is not limited thereto, and the wireless access technique may include various other techniques.

Figure 2:
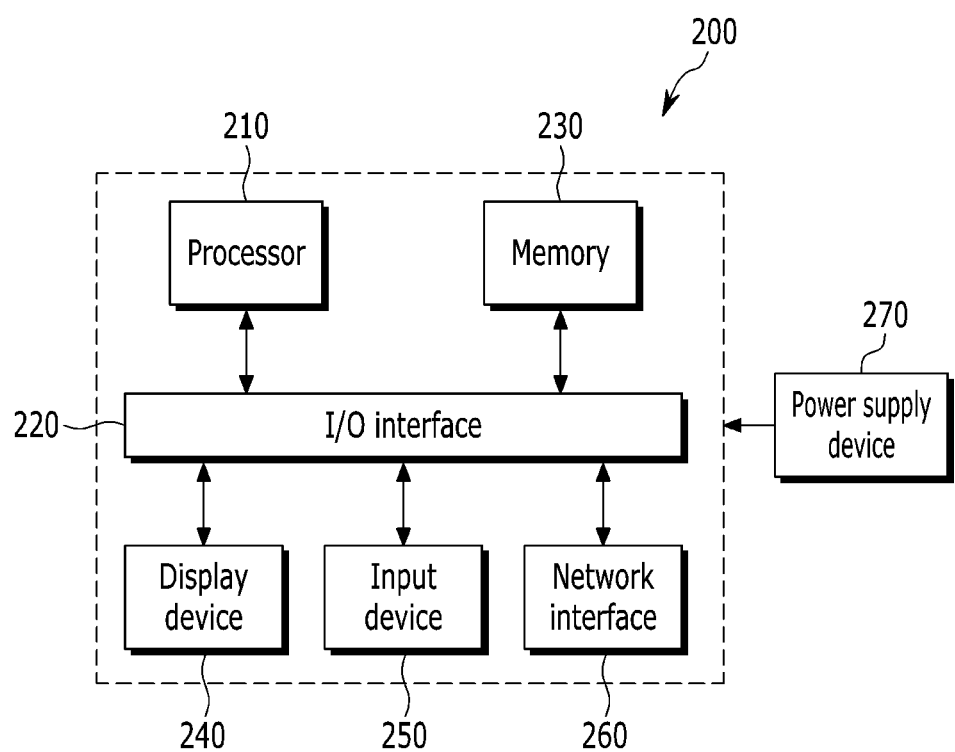
FIG. 2 is a block diagram exemplifying a computing device according to the embodiment.
Figure 3:
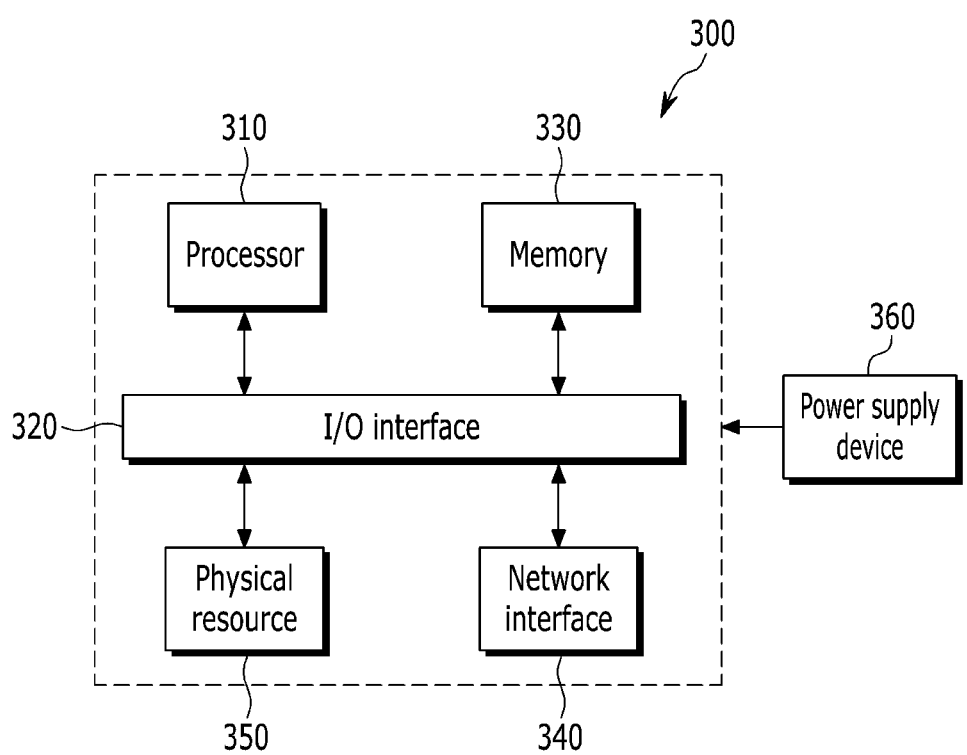
FIG. 3 is a block diagram exemplifying an IoT device according to the embodiment.

FIG. 2 is a block diagram exemplifying a computing device according to the embodiment, and FIG. 3 is a block diagram exemplifying an IoT device according to the embodiment.

Referring to FIG. 2, a computing device 200 includes a processor 210 connected to an input/output ("I/O") interface 220. In the embodiment, the processor 210 may provide functions which implement various embodiments described below, or execute instructions.

In an embodiment, the processor 210 may be a physical processor, for example. The physical processor may be, by way of non-limiting example, a universal processor and/or a special purpose processor. In an embodiment, the universal processor may include, by way of non-limiting example, a complex instruction set computing ("CISC") microprocessor, a reduced instruction set computing ("RISC") microprocessor, or a very long instruction word ("VLIW") microprocessor. In an embodiment, the special purpose processor may include, by way of non-limiting example, an application specific integrated circuit ("ASIC"), a field programmable gate array ("FPGA"), a digital signal processor, a graphic processing unit ("GPU"), or the like.

The computing device 200 further includes a memory 230 connected to the I/O interface 220, a display device 240, an input device 250, and/or a network interface 260.

The memory 230 as a computer-readable recoding medium may include a volatile memory device, a non-volatile memory device, and/or a secondary memory device. In an embodiment, the volatile memory device may be, by way of non-limiting example, a random access memory ("RAM") type memory such as a static RAM ("SRAM"), a synchronous dynamic RAM ("SDRAM"), and a Rambus dynamic RAM ("RDRAM"). In an embodiment, the non-volatile memory device may be, by way of non-limiting example, a read only memory ("ROM") type memory such as a programmable ROM ("PROM"), an erasable PROM ("EPROM'), an electrically erasable ROM ("EEPROM"), or the like, or a flash memory. In an embodiment, the secondary memory device may be, by way of non-limiting example, a magnetic or optical disk type memory.

The memory 230 may store instructions and/or data for implementing various embodiments described below, and the instructions may be executed by the processor 210. In one embodiment, when the instructions are stored in the secondary memory device among the memories 230, the instructions are loaded and stored to the volatile or non-volatile memory so as to be executed by the processor 210. In one embodiment, the instructions and/or the data transferred through a wireless or wired network from a recording medium such as a server may be stored in the memory 230 through the network interface 260.

The display device 240 displays an image and includes a display panel. In an embodiment, the display panel includes, by way of non-limiting example, a liquid crystal display ("LCD") panel, an organic light emitting display ("OLED") panel, or the like.

In an embodiment, the input device 250 may include a keyboard, a keypad, a pointing device, and/or a touch panel. In an embodiment, the touch panel may overlap the display unit 240.

The network interface 260 communicates with the IoT device and/or another computing device through a network, and may provide a wired communication interface and/or a wireless communication interface. In one embodiment, the network interface 260 may include, by way of non-limiting example, a short-range wireless communication interface such as a Bluetooth interface.

Further, the computing device 200 further includes a power supply device 270 for supplying power for the operation of each block.

Referring to FIG. 3, an IoT device 300 includes a processor 310 connected to an I/O interface 320. In one embodiment, the processor 310 may provide functions which implement various embodiments described below or execute instructions. In an embodiment, the processor 310 may be a physical processor, for example. In an embodiment, the physical processor may be, by way of non-limiting example, a universal processor and/or a special purpose processor.

The IoT device 300 further includes a memory 330 connected to the I/O interface 320 and a network interface 340. Since the memory 330 and the network interface 340 are the same as or similar to the memory 230 and the network interface 240 of FIG. 2, the description thereof is omitted.

Further, the IoT device 300 further includes physical resources 350 provided from the corresponding device. In one embodiment, the physical resources 350 may include output and/or input resources. In an embodiment, the output resource may be, by way of non-limiting example, a speaker resource, a display resource, or a printing resource, and the input resource may be, by way of non-limiting example, a microphone resource, a sensing resource, or a camera module. In another embodiment, the computing device such as the processor 310 and/or the memory 330 of the IoT device may be used as the physical resource. A wireless communication resource used in wireless communication through the wireless communication interface is not included in the physical resources.

Further, the IoT device 300 further includes a power supply device 360 for supplying power for operation of each block.

Referring back to FIG. 1, in an embodiment, the computing device 121, for example, in the IoT system 100 may intend to use the physical resources of the IoT devices 111, 112, and 113 in some cases. In an embodiment, the computing device 121 is connected to the speaker 111 to output a sound through the physical resource of the speaker 111, for example. Further, the computing device 121 is connected to the printer 112 to output a document through the physical resource of the printer 112 or is connected to the camera 113 to photograph a periphery through the physical resource of the camera 113. In an alternative embodiment, the computing device 121 such as the laptop computer is connected to the smart phone to measure brightness of the periphery through an illumination sensor which is one of the physical resources of the smart phone, for example.

However, when another device occupies the physical resource of the IoT device, e.g., the speaker 111, the computing device 121 may not use the physical resource of the IoT device 111. Further, when another device does not use the physical resource of the IoT device 111 but is connected to the IoT device 111, the computing device 121 may not use the physical resource of the IoT device 111.

Hereinafter, various embodiments for determining whether the computing device 121 is using the physical resource of the IoT device 111 are described.

Figure 4:
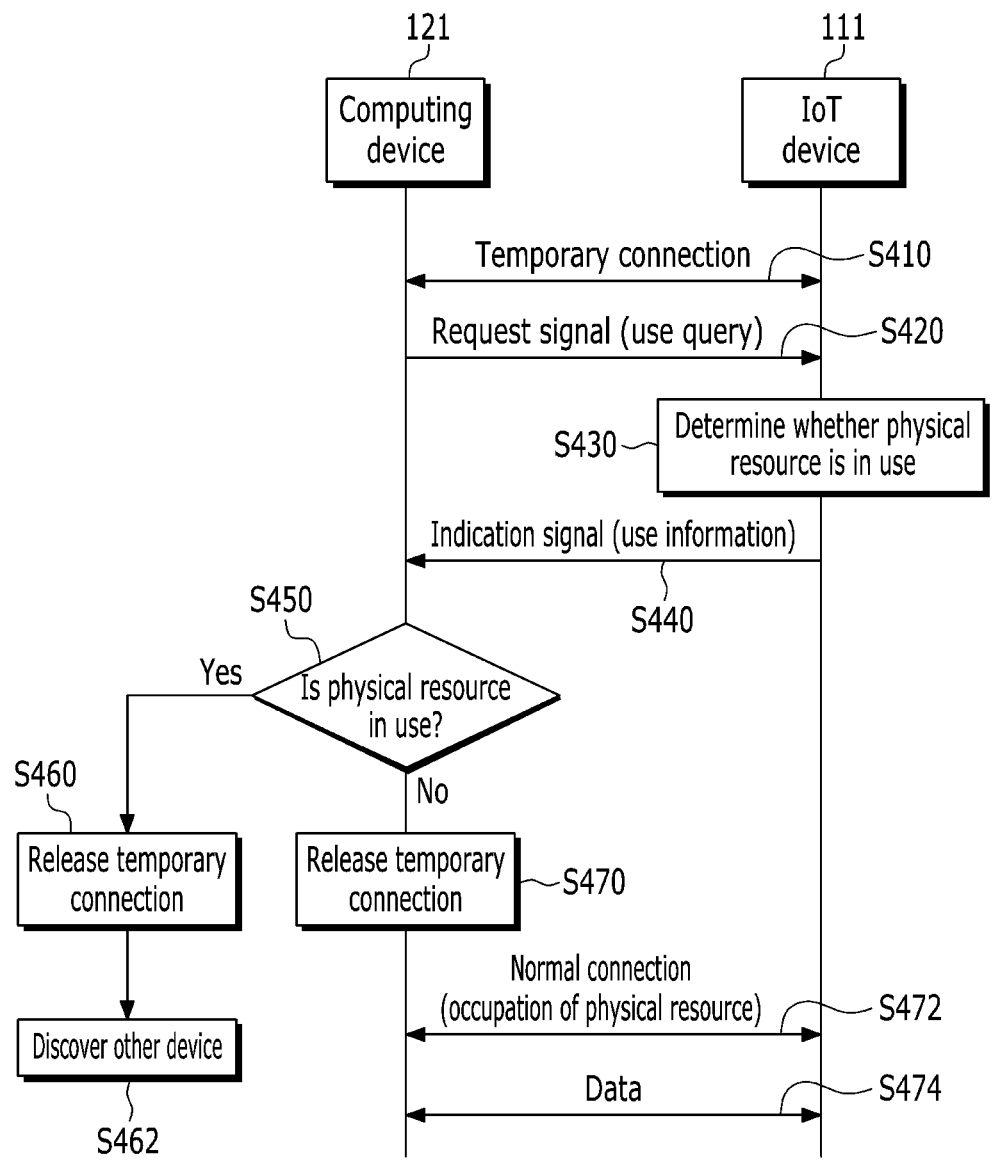
FIG. 4 is a block diagram exemplifying an Internet of Things (IoT) communication method according to an embodiment.
Figure 5:
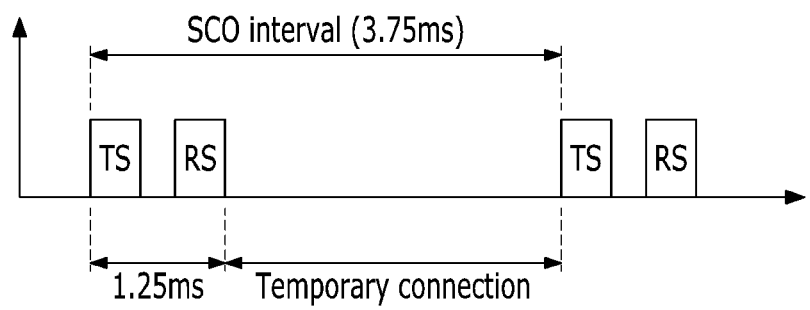
FIG. 5 shows one example of temporary connection in the IoT communication method illustrated in FIG. 4.

FIG. 4 exemplifies an IoT communication method according to an embodiment, and FIG. 5 shows one example of temporary connection in the IoT communication method illustrated in FIG. 4.

Referring to FIG. 4, a computing device 121 that intends to use a physical resource of an IoT device 111 is temporarily connected to the IoT device 111 (S410), and generates and transmits a request signal for requesting use of the physical resource or querying whether the physical resource is in use to the IoT device 111 (S420). In one embodiment, the request signal may include an identifier indicating the physical resource to be used. Then, the IoT device including a plurality of physical resources may determine whether the physical resource indicated by the corresponding identifier is in use.

The IoT device 111 determines whether the physical resource requested through the request signal is currently in use (S430), and generates an indication signal including information on whether the physical resource is in use as a response to the request signal and transmits the generated indication signal to the computing device 121 (S440). In an embodiment, the indication signal may include an identifier of the IoT device and/or the identifier of the physical resource. In another embodiment, the indication signal may include a unique pattern indicating the IoT device and/or the physical resource.

In one embodiment, based on whether power is supplied to a physical resource 350 (refer to FIG. 3) from a power supply device 360 (refer to FIG. 3), the IoT device 111 may determine whether the corresponding physical resource is in use, for example.

In another embodiment, based on whether data to be performed on the physical resource 350 is received through a network interface 340 (refer to FIG. 3), the IoT device 111 may determine whether the corresponding physical resource is in use, for example.

In yet another embodiment, the IoT device 111 may record in a memory 330 (refer to FIG. 3) whether the physical resource 350 is in use, and determine whether the physical resource 350 is in use based on information recorded in the memory 330, for example.

In still another embodiment, a processor 310 of the IoT device 111 may directly determine whether the physical resource is in use, for example.

When the indication signal indicates that the physical resource is in use (S450), the computing device 121 releases temporary connection with the IoT device 111 (S460) and discovers other IoT devices (S462). In an embodiment, when the physical resource is in use, the IoT device 111 may not transmit the indication signal, for example. In this case, when the computing device 121 does not receive the indication signal within a predetermined time, the computing device 121 may determine whether the physical resource of the IoT device 111 is in use.

When the indication signal indicates that the physical resource is not in use (S450), the computing device 121 releases temporary connection with the IoT device 111 (S470), and is normally connected to the IoT device 111 to occupy the corresponding physical resource (S472). Next, the computing device 121 transmits to the IoT device data to be performed on the physical resource of the IoT device (S474). In an embodiment, when the physical resource is a speaker resource, the computing device 121 transmits audio data to be output through a speaker of the IoT device 111, for example.

In another embodiment, the computing device 121 may be connected with an IoT device, e.g., camera 113 (refer to FIG. 1), that may support a different type of physical resource, and the computing device 121 and the IoT device 113 may transmit and receive required data to and from each other.

As such, after the computing device 121 queries whether the physical resource of the IoT device 111 is in use, the computing device 121 releases temporary connection with the IoT device 111 when the physical resource is in use. As a result, a radio resource used in the connection between the computing device 121 and the IoT device 111 may not be wasted. Further, since the computing device 121 directly receives the information based on whether the physical resource is in use from the IoT device, the computing device 121 may accurately verify whether the physical resource of the IoT device 111 is in use.

In one embodiment, the temporary connection of step S420 may be made by Bluetooth™. In this case, when another device is already connected to the IoT device 111 by the Bluetooth™, the computing device 121 may be temporarily connected to the IoT device 111 in an interval other than a time slot reserved between the IoT device 111 and the other device to exchange the request signal and the indication signal.

In an embodiment, the Bluetooth™ may use a synchronized connection-oriented ("SCO") link in order to guarantee service quality, for example, but is not limited thereto. In other embodiments, the Bluetooth™ may use various other types of protocols such as asynchronous Connection-Less ("ACL"), link manager protocol ("LMP"), host controller interface ("HCI"), low-energy link layer ("LE LL"), for example. In an embodiment, the SCO link may be maintained by using a time slot reserved at a regular interval. In embodiments, the SCO link may use various types of packets such as HV1, HV2, HV3, EV3, EV4 and EV5, for example. In the SCO link using an HV3 packet, for example, a transmission time slot TS and a reception time slot RS each of about 625 microseconds (μs) occupy about 1.25 milliseconds (ms) of a repeated SCO interval of about 3.75 ms as shown in FIG. 5. Accordingly, the IoT device 111 may transmit data to another device which is already connected in the transmission time slot TS of about 625 μs during the SCO interval and receive data from another device which is already connected in the reception time slot RS of about 625 μs during the SCO interval. In this case, since an ideal interval of about 2.5 ms which remains during the SCO interval is not reserved for another device which is already connected, the computing device 121 may be temporarily connected to the IoT device during the ideal section to transmit the request signal and receive the response signal.

In an embodiment, an interval between the transmission time slot TS and the reception time slot RS may be an arbitrary interval within an interval of 1.25 ms, and the interval may be changed by the standard. In an embodiment, the reception time slot RS may immediately follow the transmission time slot TS if permitted by the standard. FIG. 5 shows a case where an interval exists between the slots TS and RS in order to avoid the signal interference.

In embodiments, the temporary connection may use the same channel by time division or use a different channel, for example.

In another embodiment, when another device is connected to the IoT device 111, the temporary connection may be different from the connection between the IoT device 111 and another device. In this case, the different connection may be a different connection on a channel which is the same as a channel defined between the IoT device 111 and another device, a different channel on a link which is the same as a link defined between the IoT device 111 and another device, or a different link which is different from the link defined between the IoT device 111 and another device.

In yet another embodiment, the temporary connection may be a connection through a channel allocated to notify whether the physical resource of the IoT device 111 is in use.

As the indication signal, the IoT device 111 may transmit a response including a unique pattern. In an embodiment, when the speaker that may output a sound is mounted in the IoT device 111, a signature of the IoT device 111 is put in a sound with a specific band to be transmitted, for example. In an embodiment, an inaudible band may be used as the specific band so as to prevent the sound with the specific band from influencing a person. In an embodiment, the inaudible band may be a band other than an audible band in the range of about 20 megahertz (MHz) to about 20,000 MHz, for example. In this case, the computing device 121 may activate a sound input device such as a microphone so as to receive the sound from the IoT device after transmitting the request signal (S420).

As another example, when the IoT device 111 includes a light emitting device, for example, a light emitting diode ("LED"), the IoT device 111 may transmit the response including the unique pattern by a flickering scheme of the light emitting device. In this case, the computing device 121 may activate an image receiving device such as a camera 113 (refer to FIG. 1) or the like so as to recognize flickering of the light emitting device.

As yet another example, when the IoT device 111 includes a display unit, the IoT device 111 outputs a barcode including a quick response ("QR") code, i.e., matrix barcode, or a Datamatrix code, for example, corresponding to the unique pattern to the display unit to transmit the response. In this case, the computing device 121 may activate an image receiving device such as the camera or the like so as to recognize the barcode or the QR code.

As still another example, the IoT device 111 may transmit a predetermined signal used in a wireless PAN device as the response corresponding to the unique pattern.

As such, when another device is already connected to the IoT device 111, but does not use the physical resource, since the IoT device 111 which does not use the physical resource may be used through the temporary connection, a utilization rate of the idle IoT device may be increased.

Figure 6:
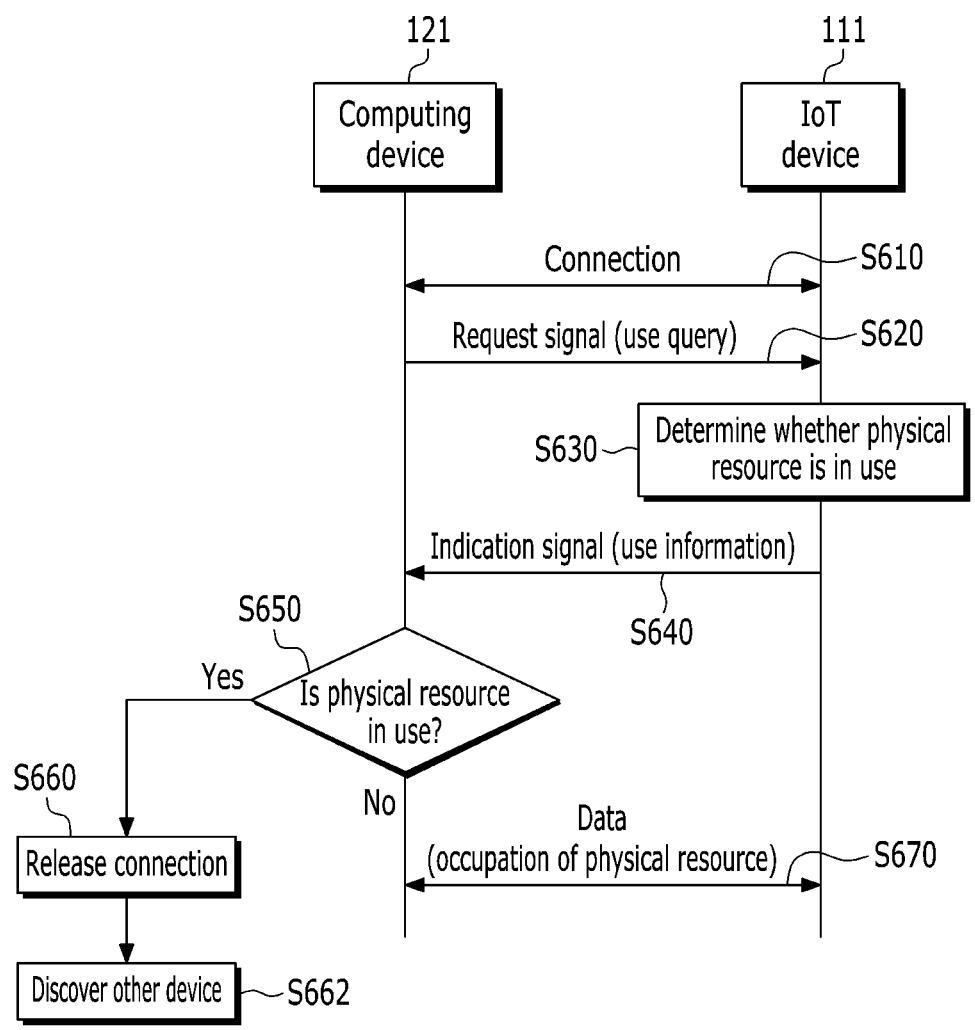
FIGS. 6, 7, 8, 9, 10 and 11 are block diagrams exemplifying an IoT communication method according to various embodiments.

FIG. 6 exemplifies an IoT communication method according to another embodiment.

Referring to FIG. 6, a computing device 121 that intends to use the physical resource of the IoT device 111 is connected to an IoT device 111 (S610), and generates and transmits the request signal for requesting use of the physical resource to the IoT device 111. In one embodiment, when another device is already connected to the IoT device 111, the computing device 121 may be connected to the IoT device 111 through a different connection in the channel which is the same as the channel defined between the IoT device 111 and the other device. In another embodiment, the computing device 121 may be connected to the IoT device 111 through a different channel in the link which is the same as the link defined between the IoT device 111 and the other device. In yet another embodiment, the computing device 121 may be connected to the IoT device 111 through the different link from the link defined between the IoT device 111 and the other device.

The IoT device 111 determines whether the physical resource requested through the request signal is currently in use (S630), and generates an indication signal including information on whether the physical resource is in use as the response to the request signal and transmits the generated indication signal to the computing device 121 (S640).

When the indication signal indicates that the physical resource is in use (S650), the computing device 121 releases the connection with the IoT device 111 (S660) and discovers other IoT devices (S662). When the indication signal indicates that the physical resource is not in use (S650), the computing device 121 occupies the physical resource of the IoT device 111 and transmits data to be performed through the corresponding physical resource to the IoT device 111 (S670).

As such, the computing device 121 may verify whether the physical resource of the IoT device 111 is in use without a temporary connection procedure.

Figure 7:
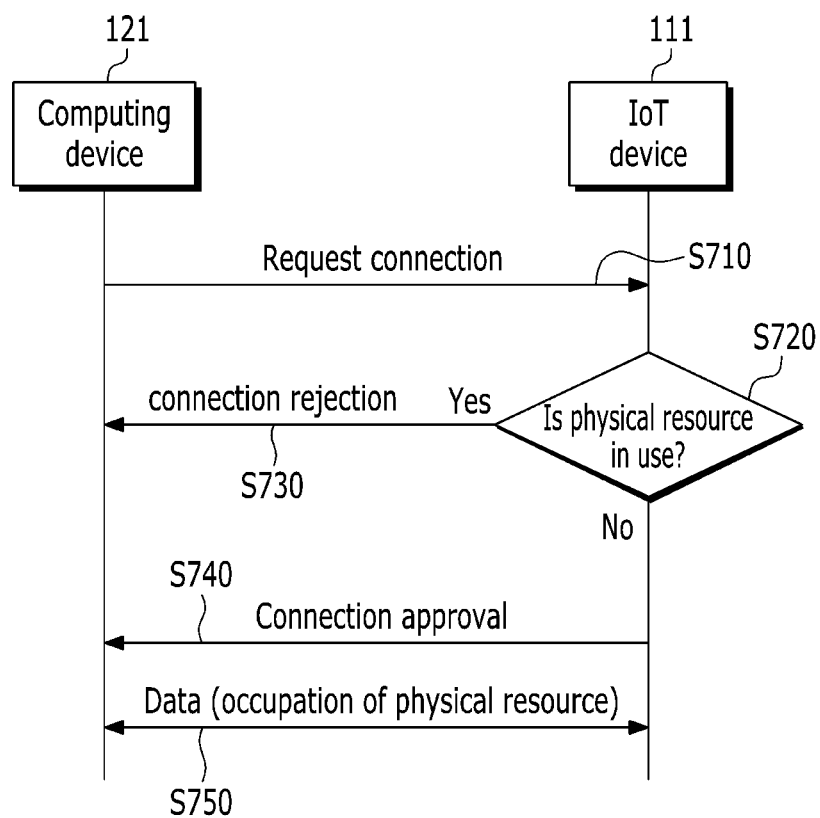

In one embodiment, a request for using the physical resource may be integrated into a connection procedure. FIG. 7 exemplifies an IoT communication method according to another embodiment.

Referring to FIG. 7, a computing device 121 that intends to use a physical resource of an IoT device 111 sends a connection request to the IoT device 111 (S710). The IoT device 111 receiving the connection request determines whether the physical resource is being used (S720). When the physical resource is in use (S720), the IoT device 111 determines that authentication of the computing device 121 is unsuccessful and notifies a rejection of the connection to the computing device 121 (S730). When the physical resource is not in use (S720), the IoT device 111 determines that the authentication of the computing device 121 is successful and notifies an approval of the connection to the computing device 121 (S740). As a result, the connection is established, and the computing device 121 occupies the physical resource and transmits data to be performed on the corresponding physical resource to the IoT device 111 (S750).

In an embodiment, the connection request which the computing device 121 transmits to request the connection to the IoT device 111 may include a field indicating a use request of the physical resource. Further, the field indicating the use request of the physical resource may include an identifier for indicating a physical resource to be used. Then, the IoT device 111 including a plurality of physical resources may determine the physical resource indicated by the corresponding field. In another embodiment, the connection request may not use the field indicating the use request of the physical resource. In this case, when the IoT device 111 receives the connection request signal from the computing device 121, the IoT device 111 may determines the connection request as the use request of the physical resource. In another embodiment, the connection request may include authentication information for authenticating the IoT device.

In a general circumstance, after the computing device determines whether resources (IoT devices) exists and sends a signal to the resources selected by the user to determine whether the resources are available, the computing device occupies the available resource. Accordingly, after the connection is rejected from the IoT device 111, the computing device may sequentially send a request to the IoT devices 112 and 113. In an alternative embodiment, the computing device may send the request to the IoT devices 111, 112, and 113 at the same time.

Figure 8:
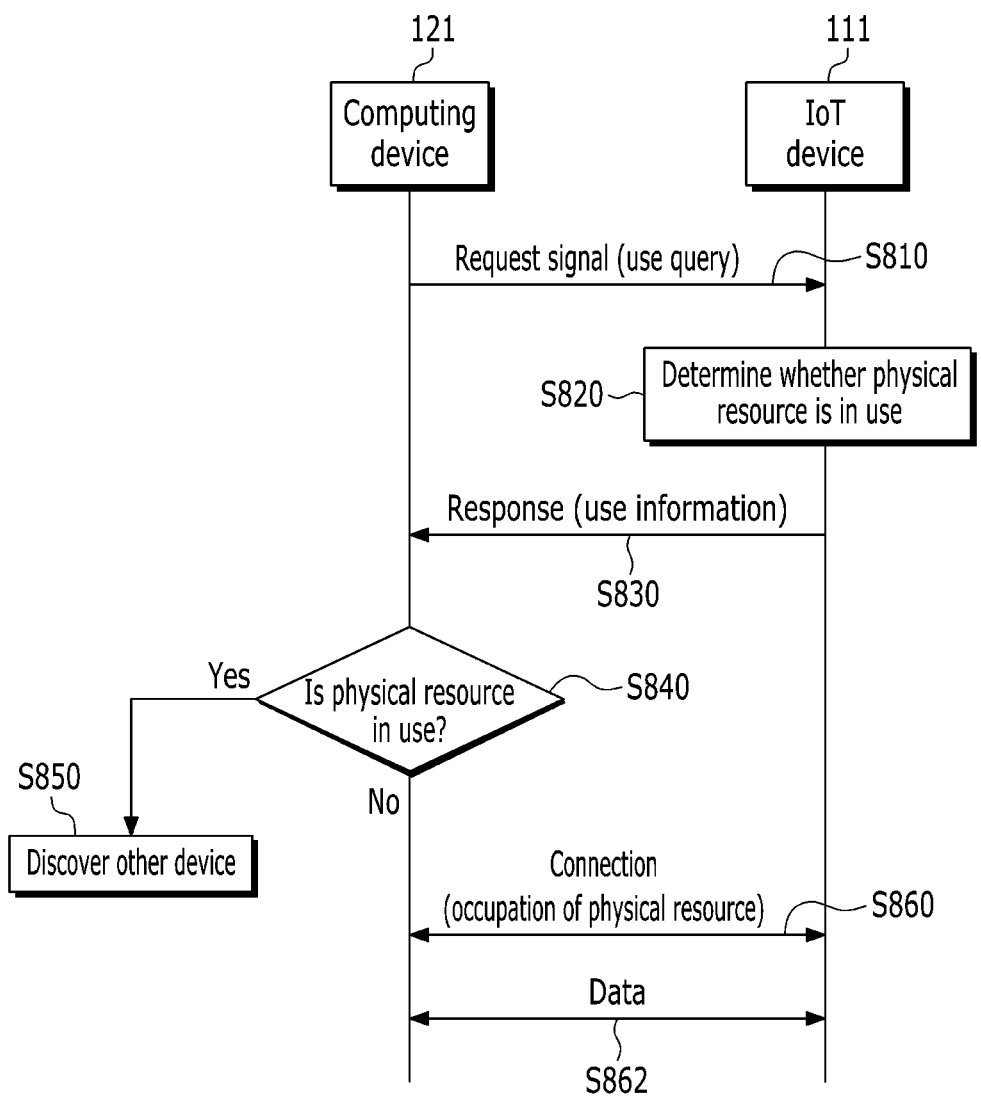

FIG. 8 exemplifies an IoT communication method according to yet another embodiment.

Referring to FIG. 8, a computing device 121 that intends to use a physical resource of an IoT device 111 transmits a request signal for requesting a use of the physical resource (S810). In one embodiment, the request signal may be transmitted without a connection with the IoT device. In an embodiment, the request signal may be transmitted as, for example, a broadcast packet or a beacon slot. The request signal may include an identifier for identifying the IoT device 111 including a physical resource to be used, or may not include the identifier. In another embodiment, the request signal may include an identifier indicating the physical resource to be used.

The IoT device 111 that receives the request signal determines whether the physical resource is being used (S820), and transmits a response including information on whether the physical resource is in use.

In an embodiment, the IoT device 111 may transmit the response as a broadcast signal, for example.

In another embodiment, the IoT device 111 may transmit the response including a unique pattern, for example.

In yet another embodiment, the IoT device 111 may transmit the response only when the physical resource is not in use. When the computing device 121 does not receive the response from the IoT device 111, the computing device 121 may determine that the physical resource is in use and discover other IoT devices. In one embodiment, when the computing device 121 does not receive the response even after retransmitting the request signal a predetermined number of times, the computing device 121 may determine that the physical resource is in use.

When the response from the IoT device 111 indicates that the physical resource is in use (S840), the computing device 121 discovers other IoT devices (S850). When the response indicates that the physical resource is not in use (S840), the computing device 121 is connected to the IoT device 111 to occupy the physical resource of the IoT device 111 (S860), and thereafter, transmits data to be performed on the corresponding physical resource to the IoT device 111 (S862).

As such, it may be notified whether the physical resource of the IoT device 111 is in use by the method such as broadcasting or sound transmission without the temporary connection procedure.

Although the embodiment has been described above, which verifies whether the physical resource of the IoT device is in use through the query/response procedure, the IoT device may notify whether to use the physical resource without the query procedure. Hereinafter, these embodiments are described with reference to FIG. 9 and FIG. 10.

Figure 9:
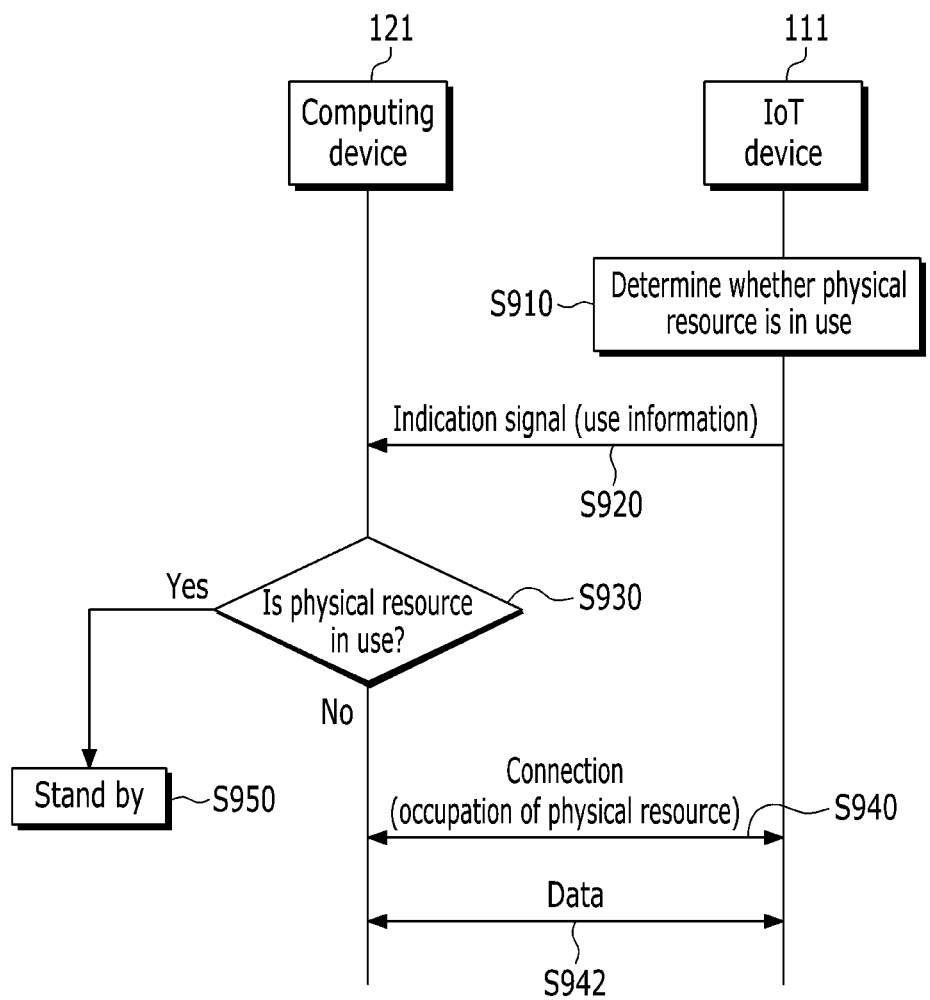
Figure 10:
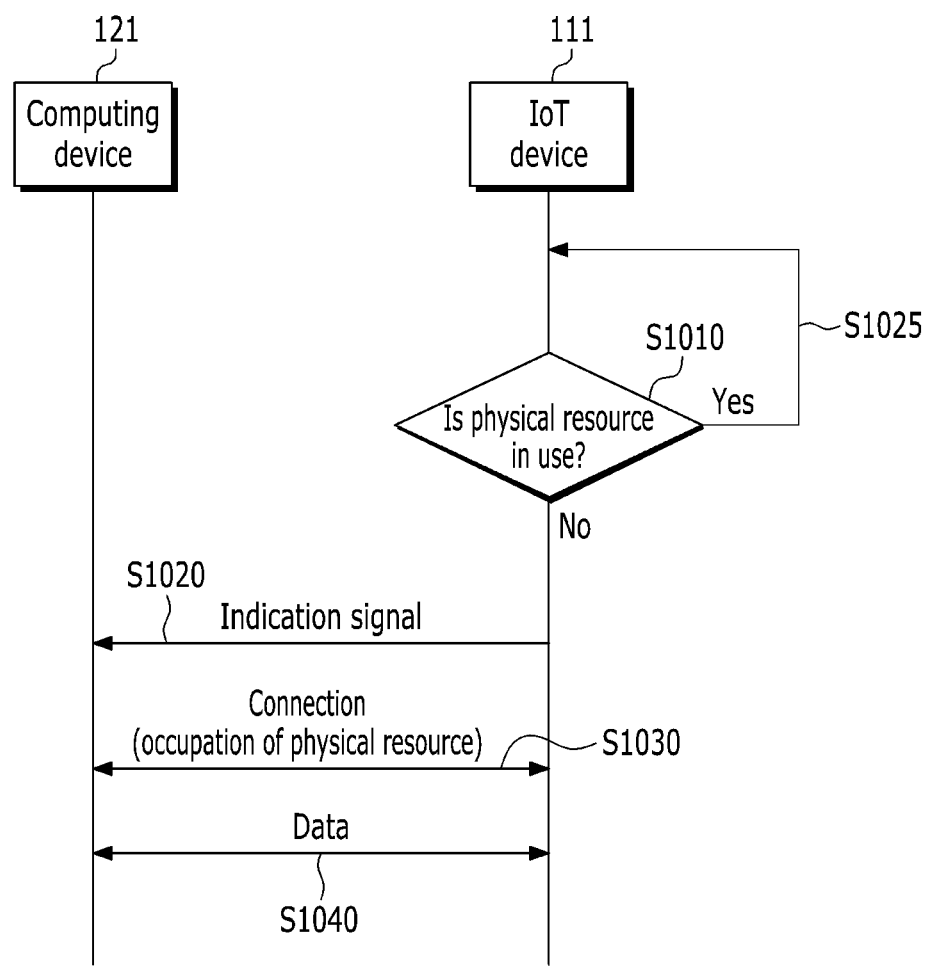

FIG. 9 and FIG. 10 exemplify an IoT communication method according to various respective embodiments.

Referring to FIG. 9, an IoT device 111 determines whether its physical resource is in use (S910). In embodiments, determining whether its physical resource is in use may be performed in real-time or periodically. The IoT device 111 transmits an indication signal including information on whether the physical resource is in use (S920). In an embodiment, the indication signal may include an identifier of the IoT device and/or an identifier of the physical resource. In another embodiment, the indication signal may include a unique pattern indicating the IoT device 111 and/or the physical resource. In one embodiment, the indication signal may be broadcasted. In another embodiment, when the indication signal may be transmitted through a speaker, for example, the indication signal may be a sound with a specific band. In one embodiment, the indication signal may be periodically transmitted.

When the indication signal indicates that the physical resource is not in use (S930), the computing device 121 receiving the indication signal is connected to the IoT device 111 to occupy the physical resource (S940), and thereafter, transmits data to be performed on the corresponding physical resource to the IoT device 111 (S942). When the indication signal indicates that the physical resource of the IoT device 111 is in use (S930), the computing device 121 receiving the indication signal stands by until the computing device 121 can use the physical resource of the IoT device 111 (S950).

According to such embodiment, the computing device 121 may know whether the physical resource of the IoT device 111 in use without a query to the IoT device 111.

Referring to FIG. 10, an IoT device 111 determines whether its physical resource is in use (S1010). When the physical resource is not in use (S1010), the IoT device 111 transmits an indication signal indicating that the physical resource is not in use (S1020). When the IoT device 111 uses the physical resource (S1010), the IoT device 111 may not transmit the indication signal and repeat the operation S1010.

The computing device 121 that receives the indication signal determines that the physical resource of the IoT device 111 is not in use and is connected to the IoT device 111 to occupy the physical resource (S1030). Subsequently, the computing device 121 transmits data to be performed on the corresponding physical resource to the IoT device 111 (S1040).

According to such embodiment, only when the physical resource is not in use, the IoT device 111 notifies that the physical resource is not in use. As a result, when the physical resource is in use, the IoT device 111 need not unnecessarily transmit the indication signal so as to reduce power consumption.

The IoT device may permit a specific computing device to use the physical resource even when a physical resource of the IoT device is occupied by another computing device. Hereinafter, this embodiment is described with reference to FIG. 11.

Figure 11:
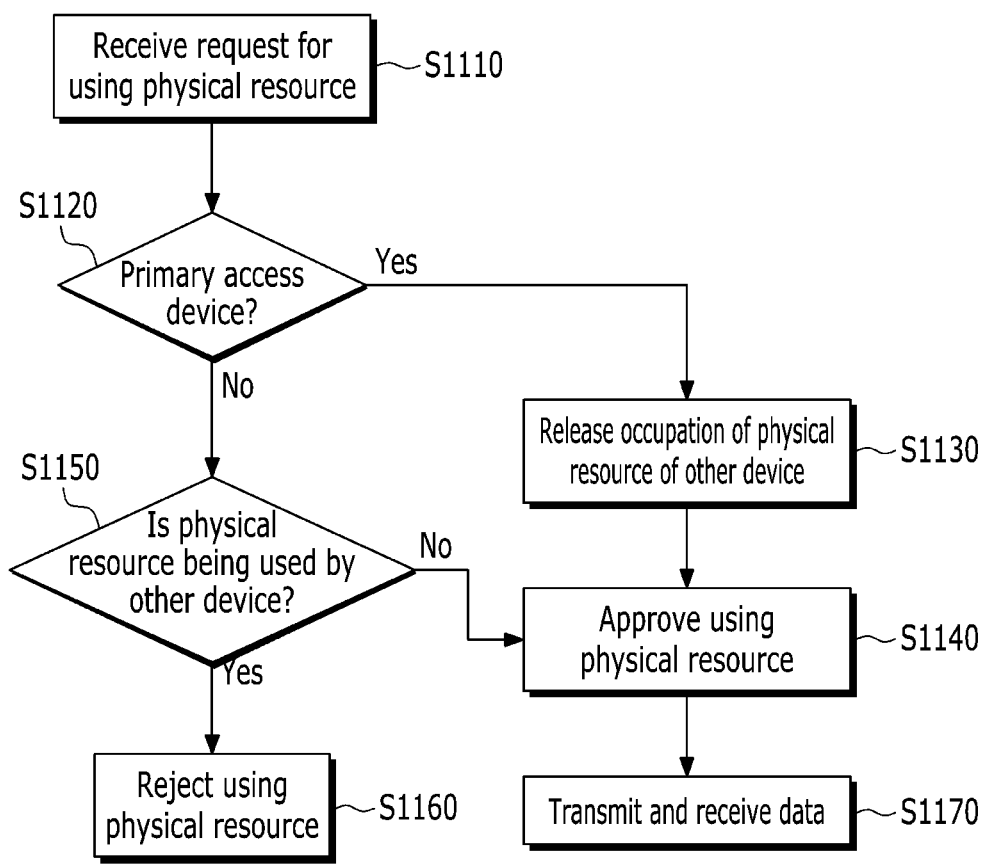

Referring to FIG. 11, an IoT device 111 (refer to FIG. 1) receives a request for using the physical resource from a computing device 121 (refer to FIG. 1) (S1110). The IoT device 111 determines whether the computing device 121 requesting the use of the physical resource is a primary access device or a secondary access device (S1120). When the computing device 121 requesting the use of the physical resource is the primary access device, the IoT device approves use of the physical resource by the computing device 121 regardless of whether the physical resource is being used by another computing device (S1140). In this case, when the physical resource is being used by the other computing device, the IoT device 111 releases the occupation of the physical resource by the other computing device (S1130). In another embodiment, differently from the embodiment exemplified in FIG. 11, after the step S1140 for approving the use of the physical resource is performed, the step S1130 for occupying the physical resource may be performed. In an alternative embodiment, the step S1130 for releasing the occupation of the physical resource and the step S1140 for approving the use of the physical resource may be simultaneously performed.

When the computing device 121 requesting the use of the physical resource is the secondary access device, the device 111 determines whether the physical resource is being used by the other device (S1150). When the physical resource is not being used by the other device (S1150), the IoT device 111 transmits an approval of using the physical resource to the computing device 121 (S1140). When the physical resource is being used by the other device (S1150), the IoT device 111 rejects the use request of the physical resource (S1160).

After the use of the physical resource is approved, the computing device 121 is connected with the IoT device 111 to transmit data for using the physical resource to the IoT device 111 (S1170).

The embodiment described in FIG. 11 may be applied to the embodiments described in FIGS. 4 to 10.

In an embodiment, whether the computing device 121 is the primary access device or the secondary access device may be registered in the IoT device in initial connection of the computing device 121 and the IoT device 111. In an embodiment, when the computing device 121 and the IoT device 111 are connected through Bluetooth™, for example, information on whether the computing device 121 being the primary access device or the secondary access device may be registered at the time of pairing between the computing device 121 and the IoT device 111.

In another embodiment, whether the computing device 121 is the primary access device or the secondary access device may be registered in a server that manages an IoT system. In this case, the IoT device 111 may download the registration information from the server and store the registration information, or receive the registration information by inquiring of the server when receiving the request signal from the computing device 121.

Figure 12:
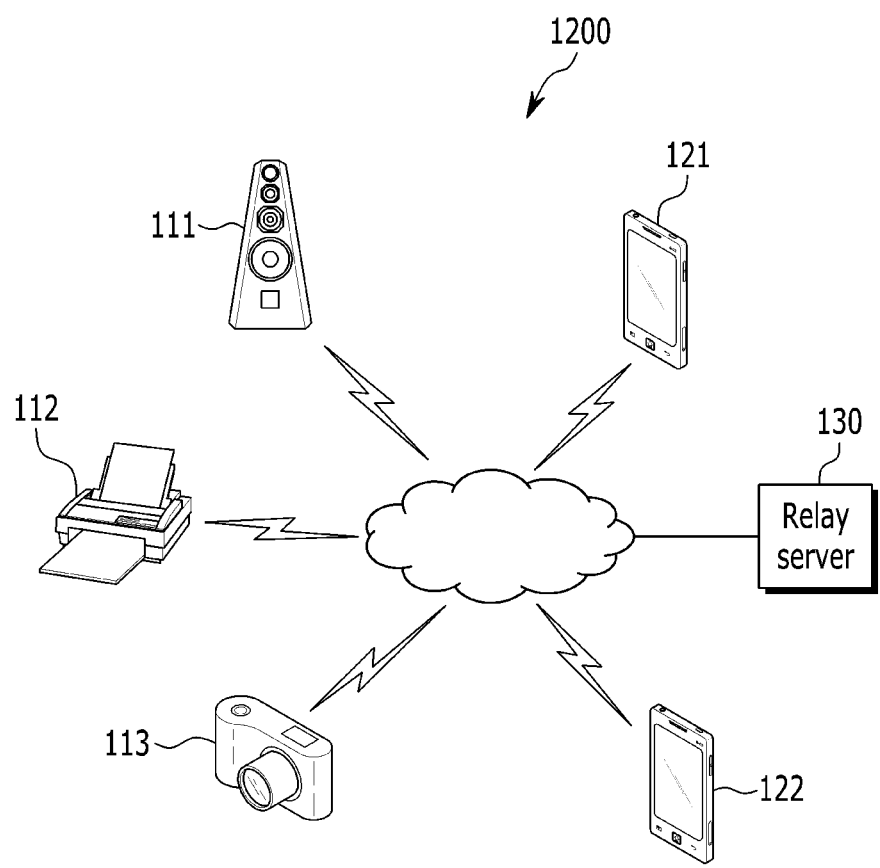
FIG. 12 exemplifies an IoT system according to another embodiment.

FIG. 12 exemplifies an IoT system according to another embodiment.

Referring to FIG. 12, an IoT system 1200 includes IoT devices 111, 112, and 113, computing devices 121 and 122, and a relay server 130. The relay server 130 may be connected to the IoT devices 111, 112, and 113 and the computing devices 121 and 122 through a wireless access technique and/or a wired access technique. In an embodiment, the relay server 130 may locally exist in the IoT system. In another embodiment, the relay server 130 may exist on a cloud network to which the IoT system is connected. Further, in another embodiment, any computing device of the IoT system may also operate as the relay server 130.

The relay server 130 manages a use state of the physical resource of each of the IoT devices 111, 112, and 113. Hereinafter, a method of managing a use state of the physical resource in the relay server 130 is described with reference to FIG. 13.

Figure 13:
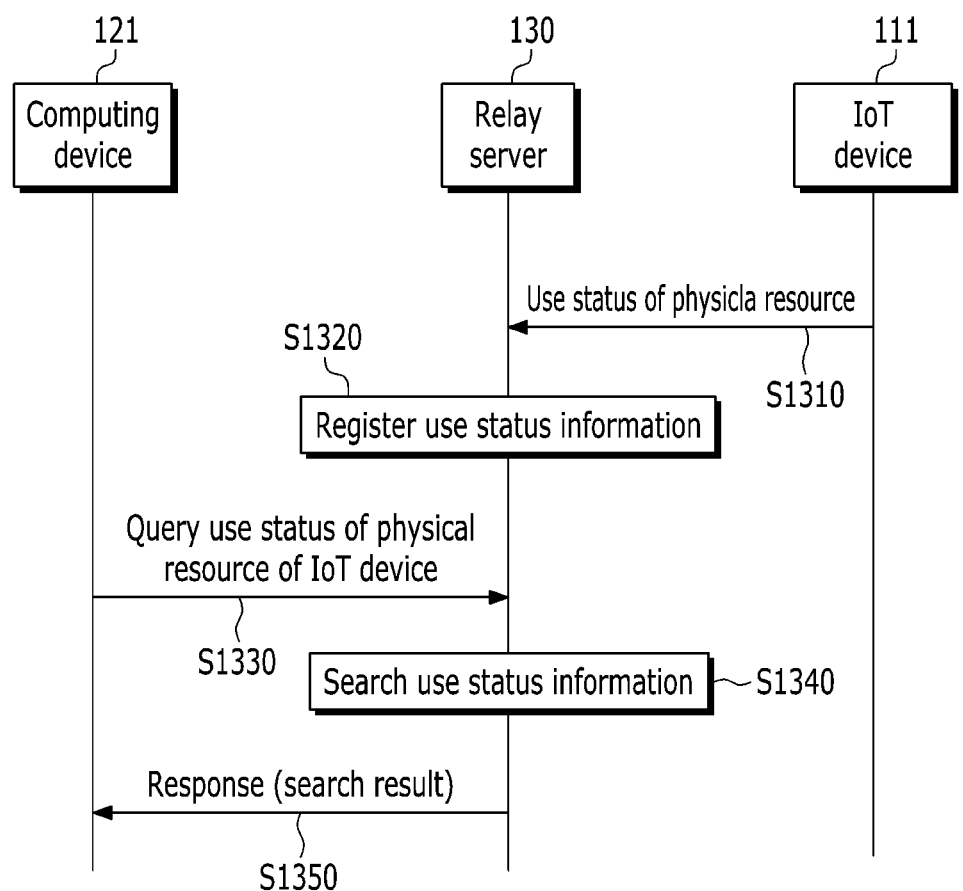
FIG. 13 is a block diagram exemplifying a method of managing a use state of a physical resource of a relay server according to the embodiment.

Referring to FIG. 13, the relay server 130 receives information for the use state of its physical resource from each of the IoT devices 111, 112, and 113 (S1310), and registers the received information (S1320). In an embodiment, information on the use state of the physical resource may include information on whether a current physical resource is in use or not. In another embodiment, the information on the use state of the physical resource may include an ending time for using the physical resource or a reservation time for using the physical resources when the current physical resource is in use.

When the relay server 130 receives an inquiry for the use state of the physical resource of a predetermined IoT device 111 from the computing device 121 (S1330), the relay server 130 retrieves the use state of the physical resource of the corresponding IoT device 111 (S1340). In one embodiment, the inquiry may include an identifier of the IoT device 111 and/or an identifier of the physical resource.

The relay server 130 transmits a retrieved result to the computing device 121 in response to the inquiry (S1350). When the retrieved result indicates that the physical resource is not in use, the computing device 121 may transmit a request for the use of the corresponding physical resource to the IoT device 111. When the retrieved result indicates that the physical resource is in use, the computing device 121 may again send an inquiry regarding the use state of the physical resource of another IoT device to the relay server 130. In an alternative embodiment, when the retrieved result includes the use ending time or the reservation time of the physical resource, the computing device 121 may transmit a request for the use of the corresponding physical resource to the IoT device 111 after the ending time or when the reservation time elapses. In another embodiment, the computing device 121 may again send an inquiry regarding the corresponding physical resource to the relay server 130 after the ending time or the reservation time elapses.

In an embodiment, the relay server 130 may directly participate in the data exchange (e.g., transmitting and receiving data) between the computing device 121 and the IoT device 111. In an alternative embodiment, the relay server 130 may be connected to the IoT device 111 while the relay server 130 has a priority access for the IoT device 111. In this case, when the computing device 121 obtains an access to the IoT device 111 through the relay server 130, the relay server 130 may release the connection with the IoT device 111 and allow the computing device 121 and the IoT device 111 to be directly connected to each other such that the data exchange can be performed between the computing device 121 and the IoT device 111.

According to the embodiment, the computing device 121 may integrally manage the physical resource state of the IoT device of the IoT system through the relay server 130.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An Internet of Things device of an Internet of Things system, the device comprising:
   a network interface which communicates with a computing device;
   a processor which transmits an indication signal indicating whether a physical resource of the Internet of Things device is in use to the computing device, and receives data to be performed on the physical resource from the computing device when the physical resource is not in use; and
   a memory which stores instructions to be executed by the processor,
   wherein the physical resource is an element included in the Internet of Things device,
   wherein the processor transmits the indication signal through a different connection from a connection between the Internet of Things device and another computing device, and
   wherein the different connection includes a different connection on a same channel as a channel defined between the Internet of Things device and another computing device, a different channel on a same link as a link defined between the Internet of Things device and another computing device, or a different link from a link defined between the Internet of Things device and another computing device.

2. The device of claim 1, wherein the processor receives a request signal inquiring whether the physical resource is in use from the computing device and transmits the indication signal in response to the request signal.

3. The device of claim 2, wherein the processor is connected with the computing device and receives the request signal.

4. The device of claim 3, wherein the request signal is broadcasted from the computing device.

5. The device of claim 2, wherein the processor broadcasts the indication signal.

6. The device of claim 2, wherein the indication signal includes a sound with a predetermined band.

7. The device of claim 6, wherein the predetermined band includes an inaudible band.

8. The device of claim 2, wherein the indication signal includes information indicating the Internet of Things device or the physical resource.

9. The device of claim 8, wherein the information includes a predetermined pattern.

10. The device of claim 2, wherein the network interface provides Bluetooth connection.

11. The device of claim 2, wherein the physical resource includes an output resource of the Internet of Things device or an input resource of the Internet of Things device.

12. The device of claim 2, wherein the physical resource includes a computing resource of the Internet of Things device.

13. The device of claim 2, wherein the physical resource is not a wireless communication resource of the Internet of Things device.

14. A method comprising:
    determining, by a processor, whether a physical resource of an Internet of Things device is in use;
    notifying, by the processor, whether the physical resource of the Internet of Things device is in use to a computing device; and
    receiving, by the processor, data to be performed on the physical resource from the computing device when the physical resource is not in use,
    wherein the physical resource is an element included in the Internet of Things device,
    wherein the notifying whether the physical resource is in use includes transmitting an indication signal for indicating whether the physical resource is in use, through a different connection from a connection between the Internet of Things device and another computing device, and
    wherein the different connection includes a different connection on a same channel as a channel defined between the Internet of Things device and another computing device, a different channel on a same link as a link defined between the Internet of Things device and another computing device, or a different link from a link defined between the Internet of Things device and another computing device.

15. The method of claim 14, further comprising receiving, by the processor, a request signal for querying whether the physical resource is in use from the computing device, wherein the transmitting the indication signal includes transmitting the indication signal as a response to the request signal.

16. The method of claim 15, wherein the indication signal indicates that the physical resource is not in use, and
    the notifying whether the physical resource is in use further includes notifying that the physical resource is in use by not transmitting the response to the request signal to the computing device for a predetermined time when the physical resource is in use.

17. The method of claim 14, wherein the notifying whether the physical resource is in use includes notifying a rejection of a connection between the Internet of Things device and the computing device to the computing device when the physical resource is in use.

18. The method of claim 14, wherein the notifying whether the physical resource is in use includes notifying an approval of a connection between the Internet of Things device and the computing device to the computing device when the physical resource is not in use.

19. The method of claim 14, further comprising receiving, by the processor, a request signal for querying whether the physical resource is in use, which is broadcasted from the computing device.

20. The method of claim 14, wherein the notifying whether the physical resource is in use includes periodically transmitting the indication signal for indicating whether the physical resource is in use.

21. The method of claim 14, wherein the notifying whether the physical resource is in use further includes transmitting the indication signal when the physical resource is not in use.

* * * * *